United States Patent
Elsässer et al.

[11] Patent Number: 5,901,754
[45] Date of Patent: May 11, 1999

[54] FLEXIBLE FLUID CONDUIT ELEMENT WITH A METAL BELLOWS

[75] Inventors: Fabian Elsässer, Straubenhardt; Tom Krawietz, Birkenfeld, both of Germany

[73] Assignee: Witzenmann GmbH Metallschlauch-Fabrik Pforzheim, Pforzheim, Germany

[21] Appl. No.: 08/814,267

[22] Filed: Mar. 10, 1997

[30] Foreign Application Priority Data

Mar. 20, 1996 [DE] Germany ............................ 196 10 910
Oct. 11, 1996 [DE] Germany ............................ 196 41 963

[51] Int. Cl.$^6$ ................................. F01N 1/08; F16L 11/00
[52] U.S. Cl. ......................... 138/118; 138/121; 181/228; 181/282
[58] Field of Search ..................... 138/118, 120, 138/121; 181/212, 227, 228, 282, 247

[56] References Cited

U.S. PATENT DOCUMENTS

| | | | |
|---|---|---|---|
| 3,773,087 | 11/1973 | Katayama | 138/120 |
| 4,307,754 | 12/1981 | Muratsubaki | 138/121 X |
| 4,315,558 | 2/1982 | Katayama | 138/121 X |
| 4,854,416 | 8/1989 | Lalikos et al. | 138/121 X |
| 5,548,093 | 8/1996 | Sato et al. | 138/121 X |
| 5,678,610 | 10/1997 | Scarazzo et al. | 138/121 X |

FOREIGN PATENT DOCUMENTS

| | | |
|---|---|---|
| 0282689 A2 | 9/1988 | European Pat. Off. . |
| 0432436 A2 | 6/1991 | European Pat. Off. . |
| 0436772 A2 | 7/1991 | European Pat. Off. . |
| 0441625 A1 | 8/1991 | European Pat. Off. . |
| 2651662 | 5/1978 | Germany . |
| 2655091 | 6/1978 | Germany . |
| 44 17 407 C1 | 11/1995 | Germany . |

*Primary Examiner*—Patrick F. Brinson
*Attorney, Agent, or Firm*—Frishauf, Holtz, Goodman, Langer & Chick

[57] ABSTRACT

To reduce turbulence in a fluid flow, especially exhaust gas from automotive internal combustion engines, within a flexible conduit element, a bellows (1, 40, 42) has an internal hose (6) located therein made of woven or knit metal wire. The hose is engaged against the internal corrugations of the bellows (1) and/or a connecting pipe (41) between adjacent bellows (40, 42) to guide the exhaust gases, and dampen vibrations and oscillations, which may become resonant with the corrugations of the bellows, and thereby decrease noise level during the gas flow. The hose (6) is engaged against the inner corrugations (3) of the bellows by, for example, first axially compressing the hose to result in permanent deformation of the wires to a diameter larger than the clear inner diameter of the bellows; by then forcing the hose into the bellows, the hose will resiliently compress and engage against the bellows. The hose, at least at one point remote from an attachment stub (4) has the wires thereof circumferentially connected so that, upon axial compression, the hose will bulge in barrel shape. More than one connection (17, 18, 20–22) of the wires may be used. The frictional engagement force may be enhanced and controlled by additional internal force spreading elements, such as springs and the like, or by formation of pimples or small bulges embossed on the outside of the hose.

40 Claims, 7 Drawing Sheets

FLEXIBLE FLUID CONDUIT ELEMENT WITH A METAL BELLOWS

FIELD OF THE INVENTION

The present invention relates to a flexible fluid conduit element, which has a metal bellows. Such a conduit element is particularly suitable for exhaust gas conduction, including exhaust gas feedback conduction of gases arising in combustion engines, especially vehicular combustion engines.

DEFINITION

As used herein and in the claims, the term "hose" is to be understood to include a hose element made of metallic wires which may be either woven or knitted. Woven metal wires preferred.

BACKGROUND

The fluid conduit elements, typically, have a conduit part with a cylindrical connection end made of metal. The conduction element further has a flexible bellows, which can be made of ring-shaped corrugations or screw-like spiral corrugations. Within the flexible bellows, coaxially arranged, is a woven or knitted hose made of metal wire. The conduit as well as the hose are securely connected at a common end. The outer diameter of the hose essentially corresponds to the clear inner diameter of the conduit element. At a further location in the longitudinal extent of the hose, the wires are irremovably relatively positioned with respect to each other around the circumference of the hose.

Conduit elements which have bellows are often also simply referred to as flexible corrugated hoses. They are made directly from a pipe to be absolutely tight, or practically tight, by spiral winding of a pre-profiled metal ribbon or tape. The conduit elements of this absolutely or practically fluid-tight connection, between two spaced pipes or other conduits, form, in a preferred case, a flexible connection within the entire exhaust gas system of an internal combustion engine, e.g. in an automotive vehicle. The flexible conduit element is provided in order to permit motion to occur, particularly engine oscillations and vibrations, without transfer of such vibrations or motions to the frame of the vehicle, and hence to the passenger compartment thereof. Preferably, these fluid conduit elements are absolutely fluid-tight, especially gas-tight.

The bellows portion itself of the fluid conduit, in dependence on required flexibility, can be made as a single-wall or multiple-wall structure. If a multiple-wall structure is used, the separate layers of the wall may be made of different materials, especially in view of corrosion effects which might differentially affect different materials. The cross-sectional shape need not be circular, but may be oval, which is used sometimes to properly fit the conduit element within available space.

The interior hose within the conduit element, fixed at one end, is used to guide the exhaust stream within the bellows and thus avoids turbulences or eddies at the inner protrusions of the corrugations of the bellows, and thereby decreases flow noises and secondary noise generation. Additionally, the inner protrusions of the corrugations of the bellows are then thermally less stressed, which also increases the lifetime of the bellows portion of the fluid conduit element.

Structures of this type in accordance with the prior art have seated the inner hose loosely or limp within the fluid conduit, except at the point of its attachment at one end to the fluid conduit element. The hose, thus, cannot accept any tasks other than those previously mentioned. Especially, it is not possible to use the hose to directly influence oscillations or vibrations of the bellows, and hence of the conduit element itself which may transfer vibrations and oscillations between connected other conduits or pipes. The interior hose likewise cannot affect the behavior of the bellows or of the conduction element as a whole with respect to resonance. Oscillations and vibrations always have accompanying acoustic effects which are annoying to persons within the vehicle.

THE INVENTION

It is an object to improve a fluid conduit element of the type described which, without interfering with movability of the conduit element itself, and basically without adding constructional components and thus increase the weight thereof, improves the performance and behavior of the bellows, and hence the entire fluid conduit element, to decrease acoustic side effects, while increasing the lifetime of the fluid conduit element.

Briefly, the outer diameter of the hose is selected to essentially match the clear inner diameter of the conduit part, for example of the bellows. The wires of the hose are relatively fixed in position with respect to each other over the circumference of the hose at least at one location remote from the end in which the hose is attached to a coupling element, such as a coupling sleeve or stub. An internal force arrangement is provided, which acts on the hose tending to radially spread or expand the hose at least at one location, frictionally, against the inner wall portion forming the clear inner diameter of the walls forming the conduit element.

The general shape and size of the conduit element, customarily used in specific vehicles, for example, need not be changed at all. This conduit element could be formed solely by a bellows with the requisite connecting ends. Alternatively, the conduit element can be formed by axially sequentially placed two or more bellows. Adjacent bellows may be formed unitary with each other, or coupled by an intermediate pipe of metal, having an inner diameter which corresponds essentially to free inner diameter of adjacent, adjoining bellows. Using the inner hose in accordance with the present invention then can, simultaneously, dampen the bellow, and the bellows and the intermediate coupling pipe together, respectively, can be damped, so that the conduit element will no longer transmit vibrations or oscillations and, additionally, is so detuned with respect to resonant oscillations that such resonant oscillations cannot occur in the particular conduit element. The hose is effectively engaged against the inner protrusions or ribs formed by the bellows and/or an intermediate coupling pipe.

The damping effect of the hose can easily be matched to the respective requirement by suitable selection of the force of the spreading arrangement, as well as by expansion and arrangement of the region of the frictional engagement between the hose and the bellows or, respectively, the conduit element. This match can be so arranged that suitable damping is obtained while, additionally, no excessive frictional forces arise between the hose and the conduit element.

The structure in accordance with the invention, basically, utilizes the well-known components, bellows, interior hose and connecting stubs or pipes, so that no increase in weight of the connecting conduit element will arise.

In accordance with a feature of the invention, the hose, prior to being fitted into the conduit element, is axially compressed or upset so that, with respect to the clear inner diameter of the conduit element, the hose will be spread and have a greater outer diameter. The compression causes a remanent deformation. After decrease of the diameter of the spread hose within a range which is within the elastic range to the free inner diameter of the conduit element, it is fitted within the conduit element, that is, typically the bellows.

This arrangement utilizes the feature that the wires of the hose are fixed with respect to each other at a further location within the longitudinal extent of the hose, apart from the end connection of the hose to a connecting stub or pipe. Before fitting the hose into the bellows, the hose is substantially longitudinally upset or compressed. The wires of the hose will then bend or kink in direction of a change of the angles of the wires with respect to each other, which results in an increase of the outer diameter of the hose in the region between the end connection of the hose and a further position of mutual connection of the wires together. The result will be an outer contour of the hose which is somewhat barrel-shaped or bulged, and which the hose will have the tendency to retain. Reducing, upon fitting the hose into the bellows, the diameter of the hose within the elastic region, the hose will still retain an inner bias to increase its diameter—which will lead to frictional engagement of the hose with the free inner diameter of the walls of the conduit element, typically the walls of the bellows, and forming the free inner diameter of the conduit element.

The result can be obtained differently, for example by first longitudinally compressing the hose and then affixing the wires of the hose together at a further longitudinal position within the longitudinal extent of the hose. Here, again, after reduction of the diameter within the elastic region of deformation of the wires necessary to fit the hose in the bellows of the conduit element, the wires will have an inner bias tending to increase the diameter of the hose and thereby engage the conduit part, typically the bellows, with tension force.

The relative positioning and reliable attachment of the wires of the hose with respect to each other can easily be formed by welding. Formation of a rolled weld seam or spot-welding, particularly using laser welding technology, are suitable.

The further position where the wires are attached, for example welded, to each other, and relatively positioned over the circumference of the hose, can be selected as the free end of the hose, that is, the end of the hose remote from its attachment to a coupling pipe. This also ensures that the weave or knit connection of the individual wires will not unravel. The further position may, however, also be located intermediate the end of the hose, and preferably, for example, closer to the connection of the hose with the conduit element as such, that is, closer to the coupling stub or pipe than the free end. The unraveling of the individual wires of the hose at the free end, after compression, then is desired and can be part of the solution to the problem in accordance with the present invention because the unraveled wires will have, overall, a wider diameter than the hose before unraveling. Thus, unraveling of the weave or knit connection of the wires of the hose leads, at the end, to an increase in the diameter of the hose, so that the free end has, or additionally has, frictional engagement with the inner walls of the conduit part formed, for example, by the bellows.

More than one location with mutual fixation of the individual wires of the hose about the circumference of the hose can be provided. Suitably, a second or at least one additional position with mutual connection of the wires of the hose about its circumference is essentially uniformly distributed over the free length of the hose. In dependence on individual requirements, for example based on temperature and character of the fluid passing through the hose, the number of increases in diameter of the hose with the previously described barrel shape or bulge can easily be selected in order to vary the engagement force and the stiffness of the hose. Decreasing the distance of the positions in which the wires are, circumferentially, affixed to each other, results in a greater plastic deformation of the hose upon longitudinal upsetting or compression, and thus a larger remanent frictional force applied on the fluid conduit element.

At least one of the further or additional positions where the wires are secured to each other, circumferentially, may have a smaller outer diameter than the clear inner diameter of the bellows. This permits control over the spreading force which is applied upon radial expansion of the hose due to the axial compression. The engaging spreading force will be more intense when the outer diameter of the position in which the wires are secured to each other is selected to be less since, upon axial compression of the hose, plastic deformation of the wires in the region of mutual interengagement of the wires of the hose will result in a greater diameter with respect to the free inner clearance diameter of the bellows.

The spreading force can also be obtained, in accordance with another feature of the invention, by causing the radial expansion of the hose by an internally inserted metallic spring. The metallic spring, or spring means, can be at least one spring with spiral winding, or a ring-shaped spring, in either instance axially positioned and fitted within the hose. The respective spring may be made of ribbon material or wire material; a spring made of ribbon material is preferably so arranged that the larger side, in cross section, is parallel to the longitudinal axis of the conduit element.

This solution permits easily predetermined radial forces to be applied with little additional material requirement, since the spring means can be predesigned. The spreading force under which the hose is engaged against the interior of the bellows can thus be readily predesigned. Use of additional spring means is particularly suitable if sufficient spreading force due to axial compression of the hose, resulting in barrel-shaped or bulged deformation, cannot be obtained with sufficient strength.

The spring may have another form, for example in the shape of a tubular sleeve of metal, corresponding at least in part or preferably essentially entirely to the length of the hose. The sleeve, of metal, has an outer diameter which corresponds essentially to the free inner diameter of the conduit element. One end is affixed to, for example integrated with, the end of the sleeve and the bellows in the connecting stub or pipe. The sleeve is formed with slits starting adjacent the connecting region to the connecting stub or pipe, and extend, for example parallel to the axis of the conduit element and uniformly distributed over the circumference of the sleeve. The fingers remaining between the slits will apply the requisite spreading force by radial expansion thereof, either inherently formed, or by resilient deformation.

The fingers may be deformed, for example, by a radially outwardly directed bulge, extending on, or over, their longitudinal extent. The extent and resilient deformation of this bulge determines the frictional engagement between the interior of the bellows and the hose. The spreading force of the fingers can be enhanced by inserting in the sleeve, in the region of the fingers, at least one metallic spreader ring which is also axially fixed in position. The spreader ring, suitably, is located in the vicinity or in the region of the free end of the sleeve particularly if the slits extend to the end of the sleeve, so that the remaining fingers are open at their ends.

DRAWINGS

FIG. 1 is a highly schematic axial sectional view of the conduit element in accordance with the present invention, and illustrating a flexible connecting element especially for use as a part of the exhaust gas system of vehicular internal combustion engines, or exhaust gas recirculation or feedback lines; and FIGS. 2–12 are axial sectional views of conduit elements similar to FIG. 1, but illustrating different embodiments.

DETAILED DESCRIPTION

Figure 1:
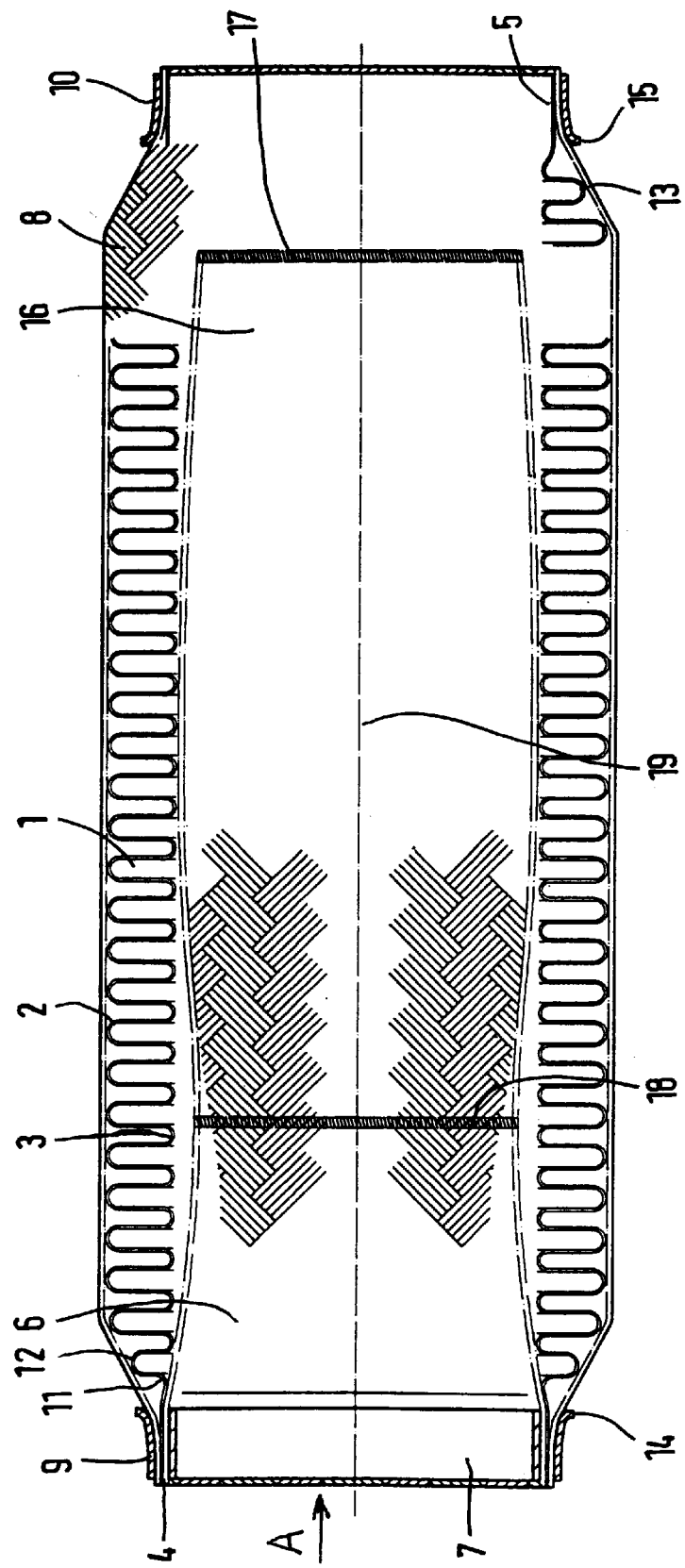

Referring first to FIG. 1:

The fluid conduit element is in form of a ring-corrugated bellows 1. The bellows 1 defines outer protrusions or ridges or rims 2, or inner protrusions, or corrugations, or ridges, or rims 3. The bellows 1 is fitted to, or has, cylindrical end stubs 4, 5. At one of the end stubs, in the illustration end stub 4, an inner hose 6 of metal is fitted. An internal support ring 7 secures the bellows 1, the hose 6, and the end 4 together. This is standard construction and well known.

The bellows 1 is covered at the outside by an outer jacket or a hose 8. Hose 8, typically, is made of woven material, and coupled to the cylindrical connection ends 4, 5 by outer or external support rings 9, 10. Hose 8 surrounds the bellows 1 with little or essentially no play.

The end connection of the stubs 4, hose 6, inner ring 7, outer hose 8, and outer ring 9, as well as the parts 5, 8 and 10, can be connected in customary manner by spot-welding or by mutual radial press-fitting of the respective components from the inside outwardly, and/or outwardly towards the inside.

The so formed connection ends permit the conduit element to be fitted on other conduit or pipe structures, not shown, to provide a flexible connection between such other pipe structures.

As can be clearly seen in FIG. 1, the interior diameter of the cylindrical end 4, 5 of the bellows 1 is larger than the free inner cross section of the bellows formed by the inwardly extending protrusions or rims due to the corrugation of the bellows 1. To provide for gradual transition of the free inner cross section of the bellows 1 to the inner hose 6, as well as the outer cross section of the bellows 1 to the outer hose 8, the first inner projection 11 of the bellows is somewhat increased in diameter with respect to the diameter at the remaining inner projections 3. Additionally, the first outer projection 12 of the bellows is somewhat decreased in diameter with respect to the outer projections 2 of the bellows 1 over the remainder thereof. The other end portion 5 of the conduit element can be mirror-symmetrical, and the decrease in diameter of the outer bellows 12 will recur, as shown at 13, also adjacent the end 5 of the conduit element.

The outer support rings 9, 10 are conically expanded at the side facing the center of the bellows 1, for example by being upwardly and outwardly lipped, as seen at 14, 15, in order to avoid any end pressure engagement with the outer textile hose 8.

Figure 8:
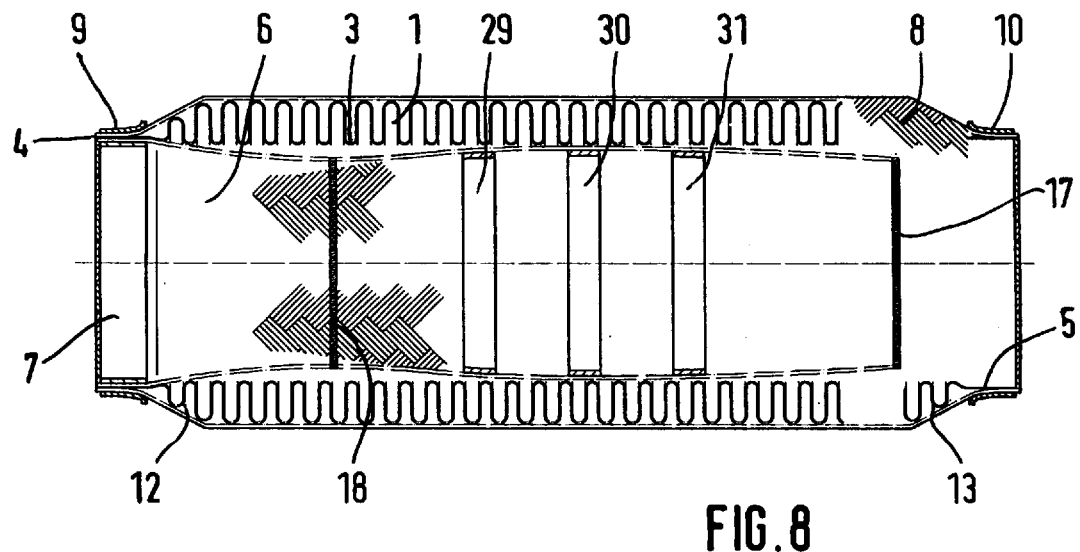
Figure 9:
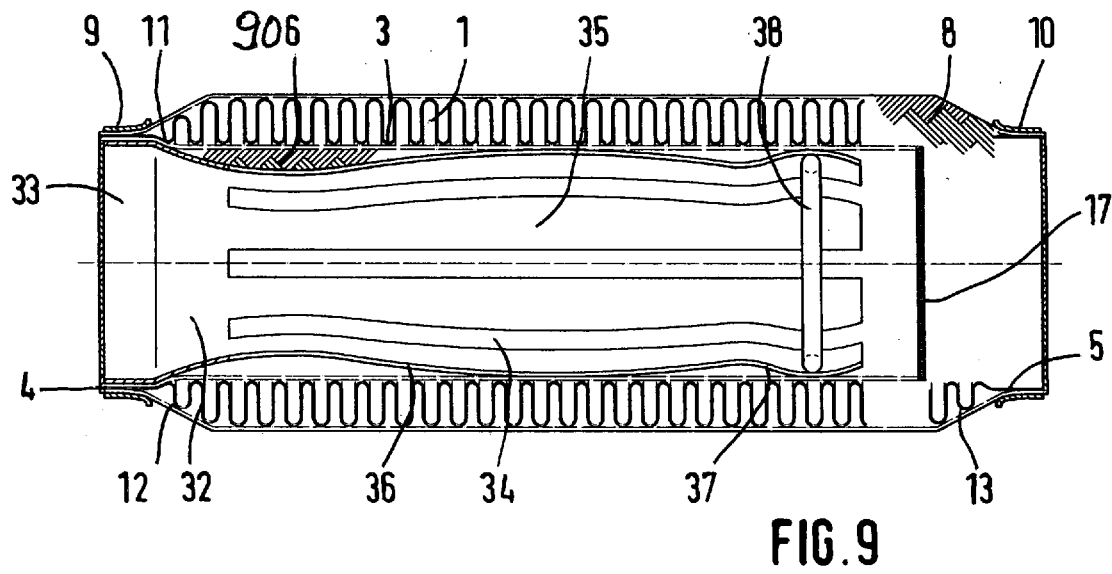
Figure 10:
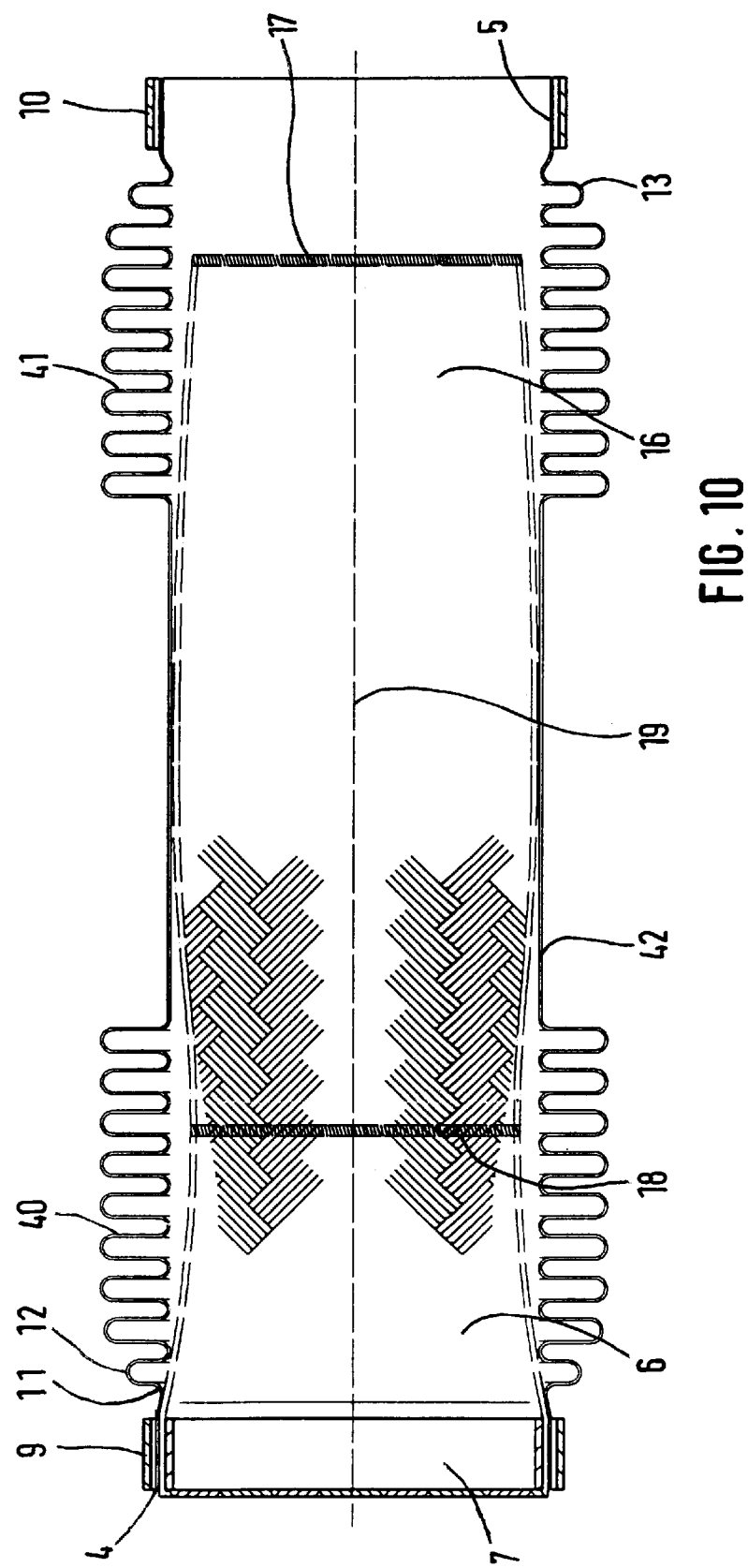
Figure 11:
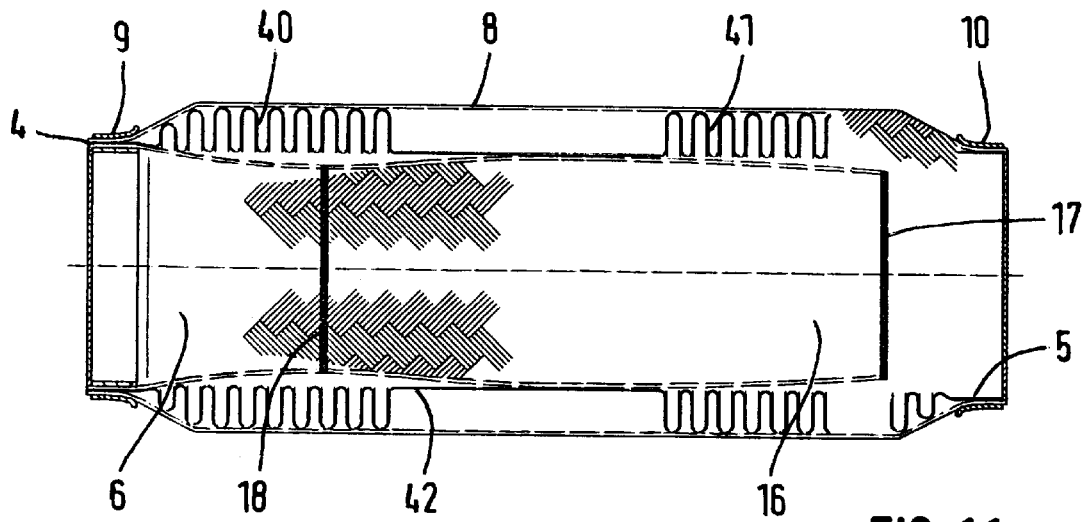
Figure 12:
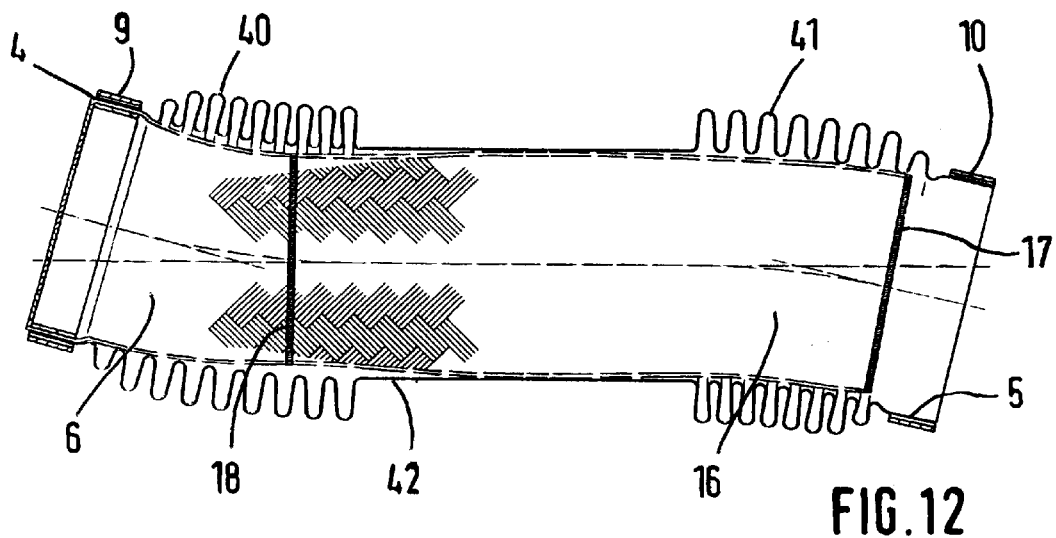

The basic construction of the element as shown in FIG. 1 is also used in the embodiments of FIGS. 2–9 in its entirety, and partially with respect to the embodiments of FIGS. 10–12, so that it will not be described again in connection with those figures; the same reference numbers, incremented by 100 when appropriate, have been used throughout.

In the embodiment of FIG. 1, as well as in the embodiments of FIGS. 2–9, the inner hose 6 extends essentially over the entire corrugated region of the bellows 1 to form a free end 16. The wires of the free end 16 may be fixed with respect to each other or, respectively, securely interconnected. Such interconnection may be obtained, for example, by a rolled seam weld 17.

In accordance with a feature of the invention, the inner hose 6, before being assembled in the bellows 1, is compressed or upset axially to such an extent that the wires forming the hose 6 will receive a remanent deformation so that, between fixed locations 17 and 18, the hose 6 will then have an outer diameter which is substantially greater than the free inner diameter of the bellows 1 defined by the inner projections or ridges 3. To assemble the hose 6, the diameter of the hose between the locations 17, 18 is reduced by elastic deformation of the wires to the predetermined clear inner diameter defined by the inner projections or ridges 3 of the bellows.

The wires of the hose 6 are interconnected to form a secure relative connection of the wires with respect to each other at a position at or in the region between the two ends of the hose 6; in accordance with the form of the invention shown in FIG. 1, this second fixed position 18 of the wires of the hose 6 is closer to the end 4 than to the free end 16.

The positions 17, 18 of the fixed locations of the wires of the hose 6 define a diameter of the hose 6 before the hose 6 is introduced into the bag 1 which is, as can be seen in FIG. 1, clearly smaller than the free inner diameter between the inner projections or ridges 3 of the bellows 1.

The referred-to plastic deformation of the wires will provide a radially directed spreader force, which tends to bias the wires of hose 6 to have a larger outer diameter than the inner diameter of the bellows 1. This force will result in an outer barrel-shaped or bulged deformation of the hose 6 extending in the direction of the longitudinal axis 19 of the conduit element, and thus provide a biassed engagement of the hose 6 against a portion of the inner projections or ridges 3 of the bellows 1.

When the hose in accordance with the invention is located within the exhaust system of an automotive vehicle, the hose 6 will have the effect to not only separate gases coming from the left of FIG. 1 from the inner projections or ridges 3 of the bellows 1 and thus prevent formation of turbulence and overheating of the bellows but, additionally, due to the frictional engagement of the hose 6 against the inner ridges 3 of the bellows 1, also dampens transfer of vibrations through the bellows 1, and/or, respectively, prevent resonant oscillations of the bellows 1, and thus prevent breakage of the bellows 1 due to resonance effects.

Figure 2:
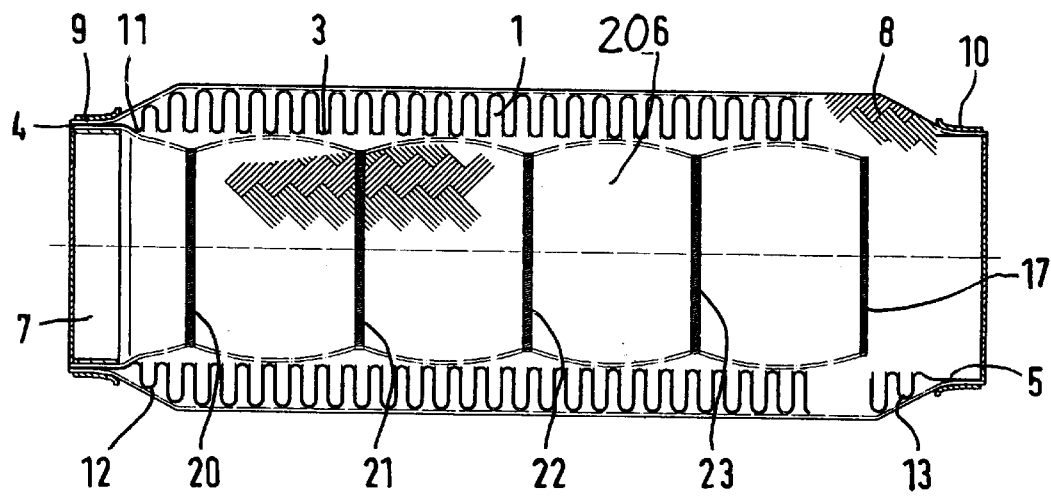

FIG. 2 differs from FIG. 1 only in the number of locations where the wires of the inner hose 226 are interconnected. As seen, the wires of the hose 226 are securely affixed together at four locations 20, 21, 22, 23, as well as at their end 17. At these locations 20–23, the wires are circumferentially mutually fixed towards each other, for example by welding. The locations 20–23 are uniformly distributed between the ends of the hose 226. As can readily be seen, the axial compression of the hose 226 will provide an outwardly bulged longitudinal cross section of the hose 26 with the bulges between the respective locations 17 and 20. The hose 226 thus will have frictional engagement at four longitudinal regions against the inner projections or ridges 3 of the bellows 1. FIG. 2 is an illustration to show that the position and number of the mutually fixed locations of the wires of the hose 226 can be matched to requirements of use of the conduit element.

Figure 3:
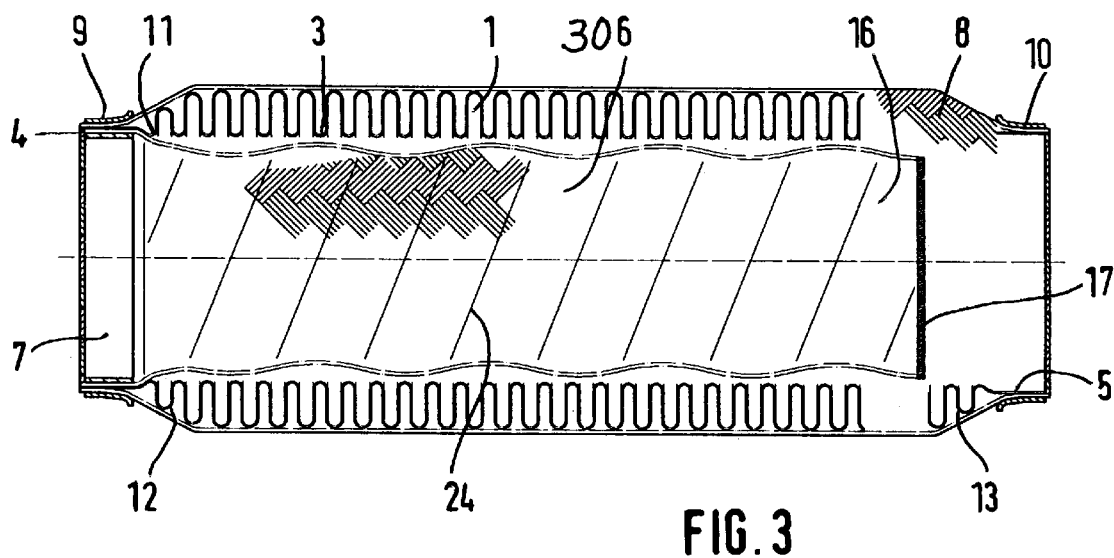

FIG. 3 illustrates an embodiment of the invention in which the hose 306 is interconnected only at its free end 16 with a circumferential connection 17 between the wires of the hose 306. The hose 306 has received a spiral or screw-form corrugation 24 during the axial compression step, for example by use of suitable tools or dies. As in the embodiment of FIG. 2, the engagement of the hose 306 with the bellows is only in parts and portions of the bellows. The embodiment of FIG. 3 provides for comparatively low engagement force between the bellows 1 and the hose 306 which, however, for use in systems which are not highly loaded or stressed, can be entirely sufficient.

Figure 4:
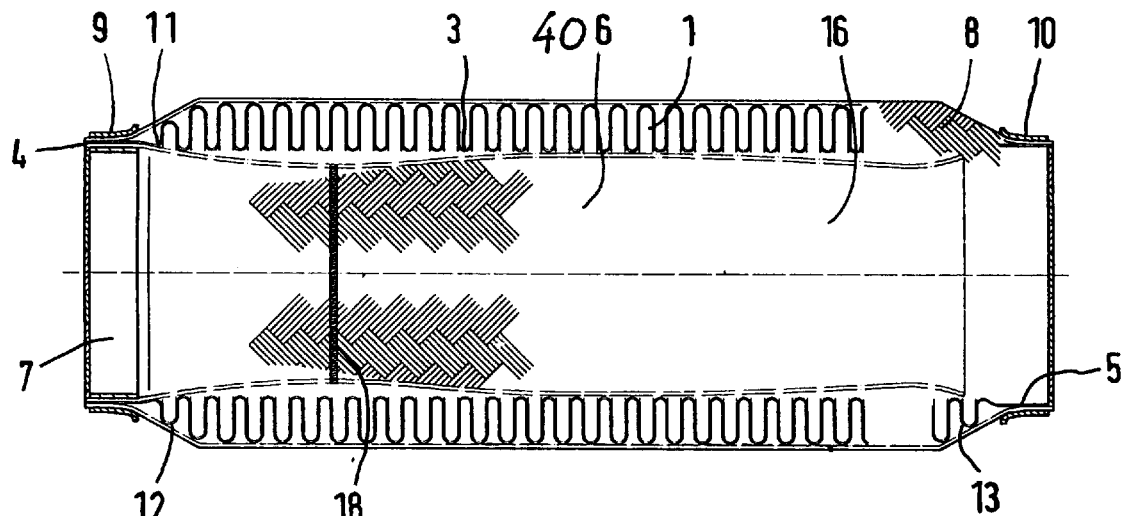

The embodiment of the invention in accordance with FIG. 4 differs from that of FIG. 1 only in that the wires of the free end of the hose 406 are left unsecured, that is, the welded end interconnection of the wires of the hose 406 is omitted. Consequently, the hose 406 can expand at its free end, as known, and expand to an extent to have engagement force against the inner ridges or projections 3 of the bellows 1. Of course, this hose, also, has been axially compressed before insertion into the bellows, so that it will have the barrel-shaped or bulged cross section between the inner interconnection of the wires at location 18 and the free end.

In the embodiment according to FIG. 5, the hose 506 has a shape similar to that described in connection with FIG. 3, that is, hose 306. Additionally, however, the hose is formed with radially outwardly directed small button-like or pimple-like projections 25. The outward appearance, then, will be a hose which has "warts" projecting therefrom. These warts or projections 25 engage the inner ridges 3 of the bellows 1. By suitable selection of the number, size and shape of the projections 25, the circumference and area of the frictional engagement between the hose 506 and the bellows 1 can easily be predetermined.

Figure 6:
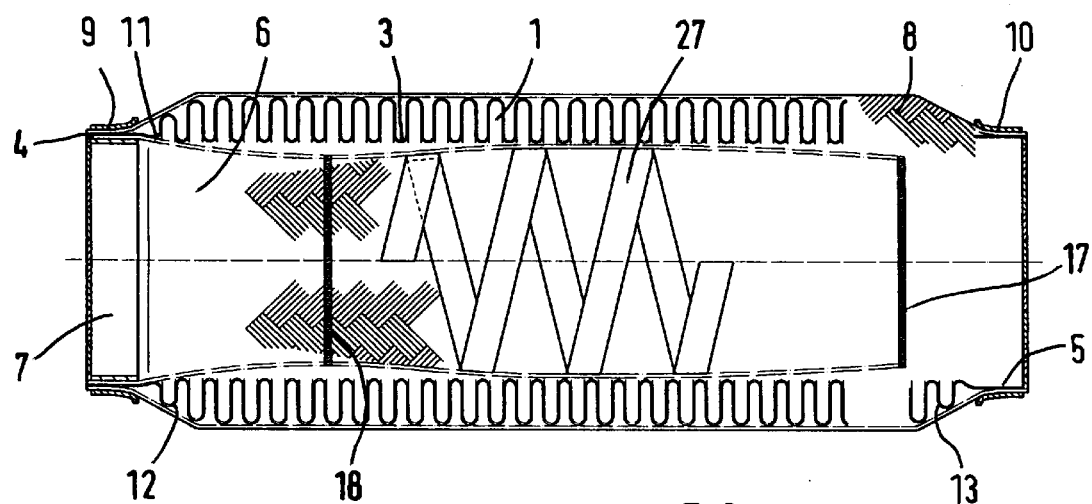

The embodiment of FIG. 6 differs from that of FIG. 1 only in that a helical metal ribbon spring 27 is inserted in the hose 6. The outer diameter of spring 27 is so selected that, when assembled within the hose 6, it applies a radially outwardly acting spreader force. This additional spreader force enhances the spreader force of the hose 6 against the inner protrusions 3 of the bellows 1 due to the axial compression thereof prior to its insertion. Such increased spreader force may be desirable for some applications to ensure higher friction against the inner corrugations of the bellows 1 and hence higher damping of the bellows. The spring 27 is placed between the positions 17 and 18 of reduced diameter of the hose 6, and thus is axially fixed in position within the hose 6.

Figure 7:
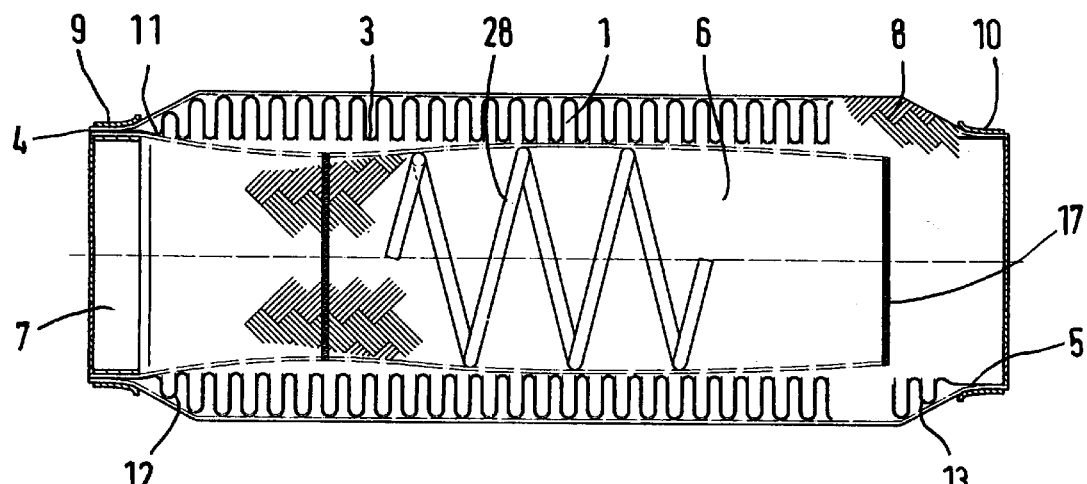

The embodiment of FIG. 7 is identical to that of FIG. 6, except that spring 27 has been replaced by a helical spring 28 made of circular wire.

The embodiment of FIG. 8 differs from that of FIGS. 6 and 7 only in that the helical springs 27, 28 are replaced by spring rings 29, 30, 31, located in staggered longitudinal positions within the hose 6. The positions of the rings 29, 30, 31 can be determined within the hose 6, for example by spot-welding the respective rings on the metal wires of hose 6 at selected locations.

The embodiment of FIG. 9 illustrates a hose 906 which, before being introduced into the bellows 1, has not yet been axially compressed. The radially acting spreader force is supplied by a metallic sleeve 32 which is inserted into the hose 906. The length of sleeve 32 essentially corresponds to the length of the hose 906. The left end 33 of the sleeve is integrated in the connection of the common ends of the bellows 1 and the hose 6. Adjacent this connection region, parallel, uniformly distributed slits 34 are placed in the sleeve. These slits extend axially, that is, parallel to the axis 19 of the conduit element. The circumferentially uniformly distributed slits 34 define remaining fingers 35 between the slits made of the material of the sleeve. The slits 34 are open to the free end of the sleeve 32; this, however, is not necessarily required, since the sleeve 32 may also have a closed end, just as its end 33, at the right side of FIG. 9.

The fingers 35 are formed with radially outwardly directed bulges 36, 37 to provide the radially outwardly directed spreader force to press the hose 906 from the interior against the inner ridges or corrugations 3 of the bellows 1. The spreader force can further be supported by placing a metallic spreader ring 38 within the bulge 37 to press the fingers 35 outwardly. The position of the spreader ring 38 within the bulge 37 can be axially predetermined, for example by one or more spot welds. The left end 33 of the sleeve 32 may, at the same time, form the inner support for the left end of the conduit element, and replace the inner ring 7.

The embodiments so far described show a construction in which the conduit element is formed solely by the bellows 1. In the embodiments of FIGS. 10–12, the conduit element is formed by two axially sequentially located bellows 40, 41, coupled together by an intermediate coupling pipe or conduit element 42, see FIG. 10. The bellows 40, 41 and the intermediate conduit element 42 can be suitably interconnected in fluid-tight connection as well known; alternatively, they may be made as a single piece of the same raw material. The inner hose 6 may correspond to any one of the hoses 6, 206, 306, 406, 506, 906. The only difference would be that the length of the inner hose is matched to the entire length of the conduit element, that is, from end portion 4 to end portion 5, FIG. 10.

FIGS. 10–12 show a hose 6 which essentially engages the intermediate conduit or connection element 42. If the embodiment of FIG. 2 is combined with that of FIG. 10 or FIG. 12, engagement would also be against the inner corrugation of the bellows 40, 41.

The embodiment in accordance with FIG. 11 is similar to that of FIG. 10 but, additionally, shows an outer cover 8 in form of a textile hose, as also described in connection with FIG. 1.

FIG. 12 illustrates the conduit element of FIG. 10 in which the respective ends are not in axial alignment, but radially offset with respect to each other.

The inner hose 6, 206, 306, 406, 506, 906, generally, is made of metal wire. To improve the characteristics, the metal wire can be coated with a corrosion-resistant and high temperature accepting material which, additionally and preferably, has good low friction characteristics. The hose may also be made by addition thereto of glass fibers, and/or may be covered with a glass-fiber woven or knit or braided covering in order to suitably control, and preferably improve, the frictional characteristics with respect to the interior corrugations of the bellows 1, 40, 41.

The hose 6 may be coated not only at the inside, but also at the outer side with a corrosion-resistant and high temperature accepting heat insulating material. Such an additional coating provides protection for the bellows and, additionally, decreases temperature losses of exhaust gases, which may be important in connections for recycling and for coupling to catalytic converters.

The length of the inner hose can be shorter than the conduit element 1, or 42, 42. It is also possible to extend the length of the hose 6 with its free end 16 to project beyond the associated connection end 5 of the conduit element, that is, project into a further coupling pipe, not shown. Any surface irregularities in the connecting regions, for example formed by coupling elements, can thus be covered, and improving resistance to turbulence in the gas flow.

In the embodiments of FIGS. 10–12, it is possible to provide two inner hose parts, each, in direction of the gas flow, starting at an upstream end of the respective bellows 40, 41 and extending, essentially, over the length of the associated bellows. This would then, in effect, conform to the connection of two conduit elements of any one of the FIGS. 1–9 by an intermediate coupling pipe.

The flow direction assumed in all the figures extends from the left side of the fixed connection of the conduit elements towards the right, see arrow A, FIG. 1.

Figure 5:
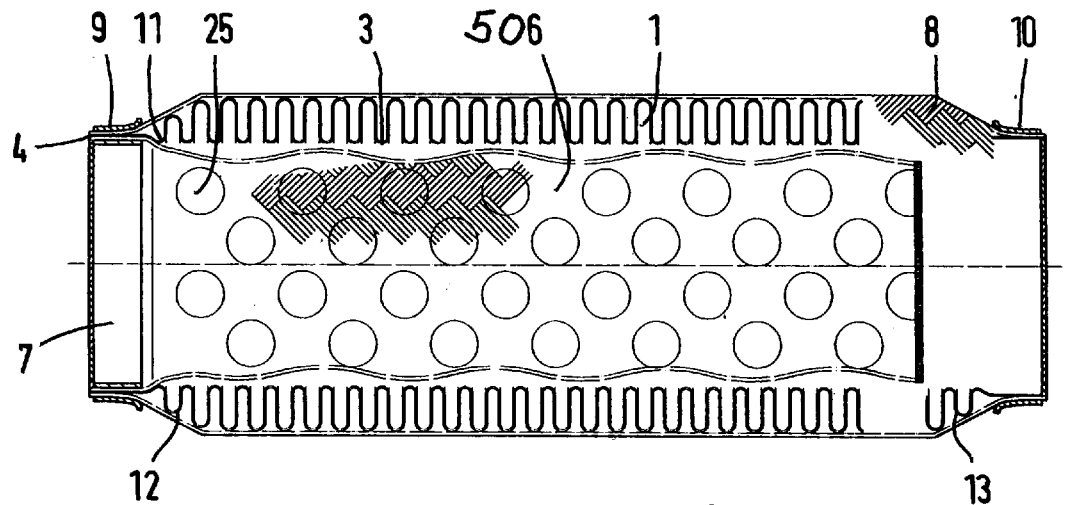

The hoses described can be made by first deforming the hoses to obtain a permanent deformation; this can be by axial compression or upsetting, and/or formation of localized external projections 25 (FIG. 5). Such projections can be obtained by suitable embossing methods. The projections have the advantage that the frictional engagement between the interior of the bellows and the hose can be precisely predetermined, both with respect to position as well as engagement force and size. It is generally suitable to spread and distribute the outwardly extending bulges essentially uniformly over the free length of the hose.

Adding interior additional spreading force elements, such as springs or the like, likewise provides ready predetermination of engagement force. The fixed connection at the common end of the conduit element between the bellows and the hose, and/or an additional outer protective hose, can be obtained by inner support rings, located without play, within the connecting end. Fixed connection can be obtained, for example, by spot welding, or mutual radial press-fitting of the parts of the conduit element. If a sleeve 32 (FIG. 9) is introduced into the hose, it, itself, may supply the support function and form a support ring at its end.

At least the end of the conduit element which is adapted for connection to another pipe should have a larger inner diameter than the essential portion of the remainder of the conduit element. Thus, by fitting the conduit element in accordance with the invention over a connection pipe, the inner cross-sectional area of the conduit element will match, essentially, the inner cross-sectional area of the supply pipe. This prevents turbulence.

When the conduit element is formed with an expanded end 4, it is desirable that the first inner corrugation of the bellows define an interior diameter which, essentially, is between the inner diameter of the cylindrical connection end 4 and the free or clear inner diameter of the bellows 1 of the remainder of the conduit element. In this manner, the hose 6 will provide a slightly curved transition from the connecting element 4 to the free inner diameter of the bellows 1, so that abrupt changes in diameter are avoided which, otherwise, may lead to excessive stressing of the connection end portion.

The length of the hose 6 should extend over the essential length of the conduit element, but particularly within the region of the corrugated bellows. The hose may, however, extend longer, in which case the end of the hose is reduced somewhat in diameter. This permits guiding of the free end of the hose into another conduit or pipe, and separates the gas flow from surface irregularities of the coupling between the conduit element and adjacent pipes or structural parts which further conduct the gas flow.

The outer cover 8, forming a jacket, preferably is a textile hose, likewise made of metal, in which the two ends of the outer jacket are securely coupled with the cylindrical ends of the conduit element 1. Connection is suitably made by spot-welding, or by respective mutual press-fitting or pressure connection, the respective parts and components forming the end portion of the conduit element. An outer jacketing provides protection for the bellows of the conduit element with respect to outer contamination and attack and, additionally, provides for axial support against undesired longitudinal extension of the bellows, for example arising due to inner pressures exerted against the conduit element.

To assure a secure connection of an outer jacket 8, it is desirable that the respective connection between jacket 8 and the cylindrical ends of the conduit element 1 be formed by an externally applied support ring, such as support ring 9 (FIG. 1) and integrated in a fixed connection at the respective ends of the conduit element.

Preferably, an external support ring, such as support ring 9 (FIG. 1), is so formed that the end thereof facing the corrugated portion of the adjacent bellows is conically expanded in order to prevent occurrence of a friction or sharp edge between the support ring 9 and the jacket 8.

A jacket 8, if used, should be so placed and the bellows so corrugated that the diameter of the outer jacket 8 does not change abruptly from one diameter to another. Thus, at least the first outer corrugation of the bellows adjacent an end portion should have a reduced outer diameter which, in general, is between the outer diameter of the remainder of the bellows and the immediately adjacent connecting ends.

The hose 6, 206, 306, 406, 506, 906, preferably, can be coated at the inside and/or outside with corrosion-resistant and high temperature accepting materials (not separately shown, since forming only a thin coating) which, preferably, also has/have/good surface sliding characteristics in order to reduce wear and tear on the frictional engagement between the respective hose and the bellows. Rather than coating the hose, or in addition thereto, the hose may also have glass fibers added thereto and/or be covered with a glass fiber fabric, which can be woven or knitted.

The hose in accordance with the present invention has the additional advantage that it can be directly interchanged with existing hoses which may have failed. Suitable materials for the metallic hose 6, 206, 306, 406, 506, 906, and especially suitable for automotive exhaust gases, can be that of any inner hoses now in use; likewise, suitable materials for the bellows can be any one now in industrial use, for example in automotive exhaust systems.

Various changes and modifications may be made, and any features described in connection with any one of the embodiments may be used with any of the others, within the scope of the inventive concept.

We claim:

1. A fluid conduit element (1), optionally for conduction of exhaust gases from internal combustion engines, having a conduit part including a metallic bellows, defining inner corrugated wall portions (3), said conduit part having coupling stubs (4, 5) attached to end portions of the conduit element;

an inner woven or knit hose (6, 206, 306, 406, 506, 906) made essentially of metal wires, said inner hose (6, 206, 306, 406, 506, 906) being secured to one (4) of said coupling stubs (4, 5) to form a common end connection therewith, wherein the outer diameter of the inner hose (6, 206, 306, 406, 506, 906) essentially matches the clear inner diameter of the conduit part;

wherein the wires of the hose are relatively fixed in position with respect to each other over the circumference of the hose at locations (17, 18, 20, 21, 22, 23) spaced from said one coupling stub (4); and internal hose spreading force means are provided, acting on the hose (6, 206, 306, 406, 506, 906) tending to radially spread or expand at least a portion of said hose and frictionally engage at least said portion of the hose with at least one facing inner wall portion of the conduit part (1, 40, 41, 42).

2. The element of claim 1, wherein said conduit part comprises at least two bellows (40, 41) located axially longitudinally sequentially, and an intermediate metallic pipe element (42) connecting said two bellows (40, 41); and wherein the inner diameter of the intermediate pipe (42) essentially corresponds to the clear or free inner diameter of the adjacent bellows (40 41).

3. The element of claim 1, wherein said internal hose spreading force means comprises a radially acting resilient expansion force of the hose upon axial compression or upsetting of the hose to a greater outer diameter thereof than the clear inner diameter of the conduit part (1, 40, 41, 42) to result in remanent deformation, and subsequent resilient decrease in the diameter of the hose to the free inner diameter of said conduit part upon insertion of the axially compressed hose into said conduit element.

4. The element of claim 1, wherein said location (17) remote from said one coupling stub (4) is the free end of the hose (6, 206, 306, 506, 906).

5. The element of claim 1, wherein said location (18, 20, 21, 22, 23) is in a position between the ends of the hose (6, 206, 306, 406, 506, 906).

6. The element of claim 5, wherein said location is closer to said one coupling sleeve stub (4) than to the free end (16) of the hose.

7. The element of claim 1, wherein at least a plurality of said locations, where the wires of the hose (206) are relatively fixed in position with respect to each other, are provided.

8. The element of claim 7, wherein said plurality of locations are uniformly distributed over the free length of the hose (206).

9. The element of claim 1, wherein the diameter of the hose, at the locations where the wires of the hose are relatively fixed in position with respect to each other, is less than the clear inner diameter of the conduit part (1).

10. The element of claim 1, wherein the wires of the hose, at the location where they are relatively fixed in position with respect to each other, are interconnected by welding of the wires.

11. The element of claim 10, wherein the welding of the wires comprises a rolled weld or spot weld.

12. The element of claim 10, wherein said welding comprises a laser weld.

13. The element of claim 1, wherein said internal hose spreading force means comprises metallic springs (27–32).

14. The element of claim 13, wherein said spring means (27, 28) comprises at least one spiral spring, fixed in axial position within said hose, and inserted therein.

15. The element of claim 13, wherein said spring means (29–31) comprises at least one ring-spring (29–31) inserted in said hose (6) and axially fixed in position therein.

16. The element of claim 13, wherein said spring means (27–31) comprises at least one of: tape or ribbon material; wire material.

17. The element of claim 16, wherein said spring means comprises at least one flat spring element (27, 29–31) including flat spring material located within the hose (6) in a position in which its larger cross-sectional side is parallel to an axis (19) of the conduit part.

18. The element of claim 16, wherein said spring means comprises a circular spiral spring (28).

19. The element of claim 13, wherein the spring means comprises a longitudinally slit tubular metallic sleeve (32) having an outer diameter corresponding, essentially, to the clear or free inner diameter of the conduit part (1, 40–42);

wherein one end (33) of said sleeve (32) is integrated into said one sleeve stub (4);

and wherein the sleeve (32) is formed with slits (34) starting from a region adjacent the connection to said stub (4) and extending, parallel to an axis (19) of the conduit part (1, 40–42).

20. The element of claim 19, wherein said slits (34) are open at the end of the sleeve remote from said stub (4).

21. The element of claim 19, wherein said fingers (35) have at least one radially outwardly directed preformed bulge (36, 37).

22. The element of claim 19, further including at least one metallic spreader ring (38) located in the region of the fingers, and axially secured in position within said hose to at least one of said fingers (35).

23. The element of claim 22, wherein said spreader ring (38) is positioned in the region of the free end of said sleeve (32).

24. The element of claim 19, wherein said sleeve (32) has an end portion extending inwardly of said stub (4) and forming a permanent fixed connection between said conduit part (1, 40–42) and said hose (906).

25. The element of claim 1, wherein said internal hose spreading force means comprises a plurality of outwardly extending pimples or bulges (25) and forming permanent deformations (25) of said hose (506).

26. The element of claim 25, wherein said bulges or pimples (25) are uniformly distributed over the entire free length of said hose (506).

27. The element of claim 1, further including an inner support ring (7) fitted into said coupling stub and forming a secure connection at the conduit part (1, 40–42) and said hose (6, 206, 306, 406, 506).

28. The element of claim 1, wherein the coupling stub (4) of the conduit part (1, 40–42) has a larger inner diameter than the remaining portions of the conduit part.

29. The element of claim 28, wherein the conduit part comprises a bellows (1) having inwardly extended corrugations (3);

wherein the first corrugation adjacent said coupling stub has an inner diameter which, essentially, is between the inner diameter of the coupling stub and the free inner diameter of the remainder of the bellows (1).

30. The element of claim 1, wherein the conduit part includes at least one bellows (1, 40, 42); and wherein the hose (6, 206, 306, 406, 506, 906) extends, essentially, over the entire length of the conduit part and at least over the length of the bellows.

31. The element of claim 1, wherein the hose (6, 206, 306, 406, 506, 906) extends beyond the entire length of the conduit part (1, 40–42).

32. The element of claim 1, wherein said conduit part further comprises an outer metallic textile hose forming a jacket (8); and wherein said outer textile hose is securely connected with the ends (4, 5) of the conduit part.

33. The element of claim 32, further including an outer tightly fitted support ring (9, 10) fitted over the outer jacket (8) at the respective cylindrical ends (4, 5) of the conduit part to form a secure connection therewith.

34. The element of claim 33, wherein the conduit part comprises at least one bellows (1, 40, 42);

wherein the support rings (9, 10) facing the corrugated portion of the bellows are conically expanded (14, 15).

35. The element of claim 32, wherein the conduit part comprises at least one bellows defining outer corrugations; and wherein the first outer corrugation of the bellows adjacent the cylindrical ends (4, 5) have a reduced outer diameter which, essentially, is between the outer diameter of the remaining corrugated portions of the bellows and the adjacent cylindrical connection end.

36. The element of claim 1, wherein said hose (6, 206, 306, 406, 506, 906) is coated with a material which is corrosion-resistant and high temperature accepting.

37. The element of claim 36, wherein said material has low surface friction characteristics.

38. The element of claim 1, wherein said hose (6, 206, 306, 406, 506, 906) includes glass fibers as part of the hose structure, or a woven or knit glass fiber jacket.

39. The element of claim 1, wherein the outer circumference of the hose (6, 206, 306, 406, 506, 906) is coated outside with a material which is corrosion-resistant and high temperature accepting and heat insulating.

40. The element of claim 1, in combination with a source of fluid, wherein the fluid source is connected to said one coupling stub (4, 5) to flow through said hose in the direction (A) from said one coupling stub to the free end (16) of the hose.

* * * * *